Dec. 4, 1945.  W. L. SCHRODER ET AL  2,390,468
PROCESS OF CANNING GREEN VEGETABLES
Filed Dec. 4, 1944
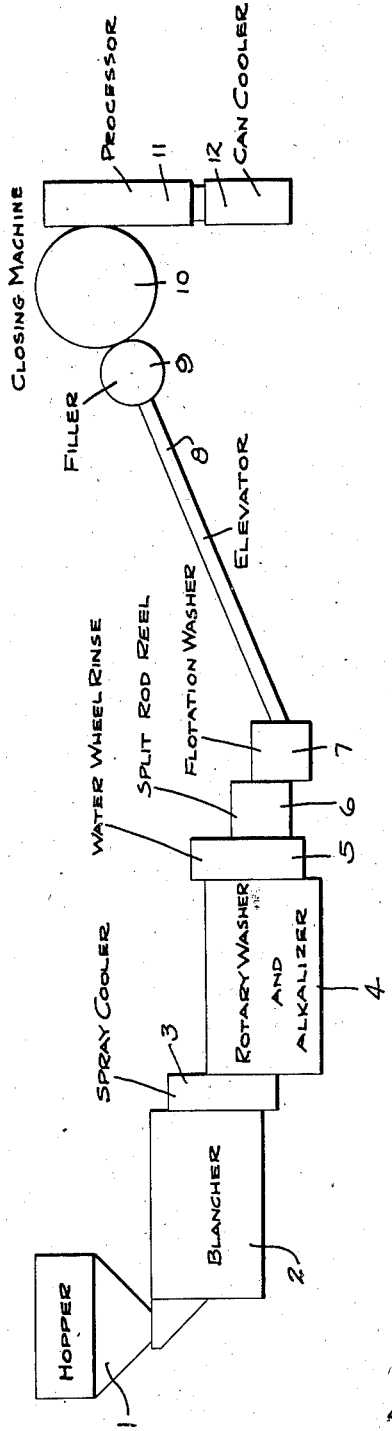
INVENTORS
WALTER L. SCHRODER &
THOMAS A. ROGERS, DECEASED
BY EDITH H. ROGERS, EXECUTRIX.
BY
Wheeler, Wheeler & Wheeler
ATTORNEYS.

Patented Dec. 4, 1945

2,390,468

UNITED STATES PATENT OFFICE 2,390,468

PROCESS OF CANNING GREEN VEGETABLES

Walter L. Schroder, Hortonville, Wis., and Thomas A. Rogers, deceased, late of Stevens Point, Wis., by Edith H. Rogers, executrix, Stevens Point, Wis.

Application December 4, 1944, Serial No. 566,426

6 Claims. (Cl. 99—186)

This invention relates to improvements in the canning of green vegetables.

It is a primary object of the present invention not only to preserve the color of green vegetables during canning, but to so shorten the period of treatment as to preserve the natural substance of the vegetable, to reduce expense, to improve penetration of the treating alkaline agent; and to make possible continuous rather than batch treatment where color preservation is practiced.

The drawing is a schematic view showing the arrangement of apparatus whereby the canning of green vegetables and the treatment thereof immediately preceding the canning operation can be conducted as a continuous operation in accordance with this invention.

It has long been known that the color of a green vegetable can be preserved in canning by adjusting the hydrogen in concentration and particularly by carrying on the pre-canning treatment in alkaline solutions.

To this end, it has been the practice to soak such products as peas for considerable periods in heavily alkaline solutions in order to neutralize any acidity and enable the vegetable to absorb substantial alkalinity before being blanched. In the course of the soaking for the time required for penetration of the vegetable by the alkaline solution, the vegetable is quite apt to become softened to an objectionable degree, with the result that subsequent handling is made difficult and substantial impairment of quality occurs.

We have discovered, and the present invention is based in part on the fact, that if the blanching precedes the soaking in alkaline solution, it is possible, without any appreciable impairment of color, to reduce by approximately two-thirds the soaking time otherwise required, with the result that the vegetable is not appreciably softened in soaking. The blanching removes from the surface of the vegetables any mucilaginous substance in this material, such as is naturally present (this applies particularly to peas), and drives off the air from the cells of the vegetable and opens the pores and possibly otherwise prepares the vegetable to receive the alkaline reagents relied upon to preserve color. The result is that the time required for treatment and the concentrations of alkaline agent heretofore required are both reduced, and continuous treatment becomes possible.

Apparatus for the continuous practice of the invention is shown schematically in the drawing. All of the apparatus schematically illustrated is designated by the name by which it is known to the industry, all such apparatus being in common use in other connections.

The hopper 1 feeds the blancher 2 from which the vegetables are discharged through the spray cooler 3 into a rotary washer 4 containing an alkaline solution, such as a sodium carbonate or sodium hydroxide solution. It is in the rotary washer that the soaking occurs. The water may also advantageously have added to it an edible alkali-compatible wetting agent or surface active agent. It is not essential to use any particular agent in the class identified. Examples are the product commercially known under the trade name "Margo" and manufactured by American Lecithlein Co., and the products commercially known under the trade names "Spans" and "Tweens" manufactured by Hercules Powder Company. The use of such agents assists in the rapidity and extent of penetration of the alkali and reduces the amount of alkali required. The invention may, however, be practiced without such agents.

From the rotary washer the vegetables are discharged into the water wheel rinse apparatus 5 from which they pass to the "split rod reel" 6 and thence to the floatation washer 7. From the floatation washer an elevator 8 delivers the vegetables to the can filler 9 and the filled cans pass to the closing machine 10. From the closing machine 10 the cans pass through the processor 11 into the cooler 12.

Specifically, our preferred process is as follows, reference being made to peas by way of example. With minor changes well within the skill of those familiar with this art, the process may be adapted for other green vegetables.

Normally, the first step (after cleaning and size grading or other preliminary preparation) comprises blanching the peas, preferably in plain water. For peas of average quality and maturity, we prefer to blanch for ten minutes at 190 degrees Fahrenheit. The precise time and temperature may be varied, however, within a wide range of from one to fifteen minutes or more according to the nature of the blanching equipment and the maturity and variety of peas and the temperature of the hot water blanch. The temperature preferably ranges from 160 degrees to a maximum of 212 degrees. The hotter the water, the faster the blanch. The blanch used in this process does not differ in any way from conventional blanching practice except that, pursuant to the present invention, it precedes the alkaline soak and is preferably conducted with untreated water.

If desired, the vegetable may be treated briefly with an alkaline reagent either by soaking or spraying preceding the blanch, but the present invention contemplates that the blanch must precede at least the principal period of alkaline soaking to make possible the penetration of the alkali in a short enough soaking period so that the vegetable will not lose its firmness.

Following the blanch, the peas are cooled to approximately 130 degrees Fahrenheit or lower, this being preferably done rapidly by a rinsing spray. Up to this point, no alkali has been added in the preferred practice of the invention, although the invention does not necessarily exclude the use of alkaline ingredients or wetting agents either in the pre-soak (if any) or in the blanch water or the spray. The purpose of the rinse insofar as color preservation is concerned is to rapidly lower the temperature. This is in addition to its usual cleansing action.

The third step is to soak the peas in an alkaline solution with or without a wetting or surface active agent as above described. Because of the preliminary blanching step, we find that the soaking may be conducted in mildly alkaline solutions for relatively brief periods. We soak for fifteen minutes at room temperature (or at least not over 130 degrees) in water containing 50 grams of sodium carbonate per gallon. There is preferably agitation of the peas in the soaking solution, the operation being preferably conducted in a rotatable screen-type rinsing apparatus of conventional type. Heretofore, soaking has been conducted only as a batch operation. It has been practiced, for example, using 120 grains per gallon of sodium hydroxide, a relatively strong alkaline reagent, for a period of thirty minutes. With the same alkaline concentration used in our preferred process, this conventional soaking would require sixty minutes or more. Our soaking time is, therefore, reduced to one quarter, or at least less than one-third, of that previously required.

Finally, the peas are canned in a brine which initially contains only salt and sugar for flavor. In the can, an alkaline reagent is introduced in the form of a tablet whereby the exact amount of alkaline reagent can be measured in advance to produce the desired alkalinity in the can. In a 303 x 407 can (3 $\frac{3}{16}$ inches diameter and 4 $\frac{7}{16}$ inches tall), we may use a tablet containing ten grams of sodium bicarbonate and five grams of magnesium oxide.

We do not, however, care to limit ourselves to these particular alkali reagents in the tablet. It so happens that bicarbonate, in particular, will give off carbon dioxide in processing. In a small can this is immaterial but in a large can deformation of the can may result. For this and other reasons we may substitute such potassium or sodium salts as sodium tetra phosphate or sodium metasilicate, or trisodium or trisodium phosphate, or di-sodium or di-sodium phosphate. These are but examples of other alkaline reagents which it may be preferred to use in the tablet.

The cans are sealed and processed for eight minutes at 260 degrees Fahrenheit, followed immediately by water cooling to a temperature of 70 degrees Fahrenheit or lower. As is well known in the art, correspondingly larger cans would receive correspondingly increased alkali and processing time. The amount of alkali introduced in the tablet is sufficient so that after equalization occurs, frequently in one or two days after the can is sealed, the pH will be between 7 and 9, preferably 7.5.

After the can is sealed, processed and cooled, it should preferably be stored at a temperature of 55 degrees Fahrenheit or lower, if the color is to be preserved as long as possible.

In the completed canned product, the hydrogen ion concentrate is briefly at an approximate identical level at which it is found to exist in the fresh vegetable in growth. While it is common to provide a slight excess of alkalinity, the effort is to maintain as nearly as practicable the original hydrogen ion concentration.

As a result, the vegetable will not be bleached in color nor will it be overdarkened in the manner commonly experienced in prior attempts to preserve color. On the contrary, the color of vegetables prepared and canned in accordance with this invention will be substantially identical with the color of the vegetable at the time it is harvested.

The specific details herein furnished are given by way of example and we do not wish to be limited except as indicated in our annexed claims.

We claim:

1. In a method of canning green vegetables while preserving their color and firmness of substance by a process involving blanching in hot water and an alkaline treatment at a lower temperature, the steps which comprise blanching the vegetables in hot water prior to the principal alkaline treatment, cooling the vegetables to a temperature above the freezing temperature but not exceeding about 130 degrees F., and applying to the vegetables without substantial further increase in temperature an alkaline solution of an edible alkaline reagent which is very substantially soluble in cold water.

2. In a method of canning green vegetables while preserving their color and firmness of substance by a process involving blanching in hot water and an alkaline treatment at a lower temperature, the steps which comprise blanching the vegetables in hot water prior to the principal alkaline treatment, cooling the vegetables to a temperature above the freezing temperature but not exceeding about 130 degrees F., applying to the vegetables without substantial further increase in temperature an alkaline solution of an edible alkaline reagent which is very substantially soluble in cold water, and canning the vegetables in a brine containing a very slightly water soluble, edible alkaline magnesium compound.

3. In a method of canning green vegetables while preserving their color and firmness of substance by a process involving blanching in hot water and an alkaline treatment at a lower temperature, the steps which comprise blanching the vegetables in hot water prior to the principal alkaline treatment, cooling the vegetables to a temperature above the freezing temperature but not exceeding about 130 degrees F., applying to the vegetables for a substantial period of time without substantial further increase in temperature an alkaline solution of an edible alkaline reagent which is very substantially soluble in cold water, and canning the vegetables in a brine containing a very slightly water soluble edible alkaline compound and a second relatively freely water soluble edible alkaline compound, the said compounds being added to the can in the form of a tablet.

4. In a method of canning green vegetables while preserving their color and firmness of substance by a process involving blanching in hot water and an alkaline treatment at a lower temperature, the steps which comprise blanching the vegetables in hot water prior to the principal alkaline treatment, cooling the vegetables to a temperature above the freezing temperature but not exceeding about 130 degrees F., and continuously agitating the vegetables for a substantial period of time without substantial further increase in temperature with an alkaline solution of an edible alkaline reagent which is very substantially soluble in cold water.

5. A method as set forth in claim 3 in which the substantially soluble alkaline reagent is sodium carbonate and the compounds added in the form of a tablet comprise sodium bicarbonate and magnesium oxide.

6. In a method of canning green vegetables while preserving their color and firmness of substance by a process involving blanching in hot water and an alkaline treatment at a lower temperature, the steps which comprise blanching the vegetables in hot water prior to the principal alkaline treatment, cooling the vegetables to a temperature above the freezing temperature but not exceeding about 130 degrees F., continuously agitating the vegetables for a substantial period of time without substantial further increase in temperature with an alkaline solution of an edible alkaline reagent which is very substantially soluble in cold water, and rinsing the vegetables, the steps of blanching, cooling, treating with alkali during agitation, and rinsing being carried on as a single continuous process.

WALTER L. SCHRODER.
EDITH H. ROGERS.
*Executrix of the Estate of Thomas A. Rogers, Deceased.*